United States Patent [19]
Gaudette, Jr. et al.

[11] 3,820,013
[45] June 25, 1974

[54] INTERNAL COMBUSTION ENGINE IGNITION TIMING INSTRUMENT

[75] Inventors: Walter M. Gaudette, Jr., Royal Oak; Philip K. Trimble, Rochester, both of Mich.

[73] Assignee: General Motors Corporation, Detroit, Mich.

[22] Filed: Oct. 16, 1972

[21] Appl. No.: 298,030

[52] U.S. Cl.............................. 324/16 R, 324/83 A
[51] Int. Cl............................................. F02p 17/00
[58] Field of Search...... 324/15, 16, 16 T, 19, 83 A, 324/782, 78 Q, 161; 73/116, 117.3, 118, 119, 119 A

[56] References Cited
UNITED STATES PATENTS
2,863,114  12/1958  Murphy............................. 324/16 T
3,630,076  12/1971  Staudt................................ 324/15

FOREIGN PATENTS OR APPLICATIONS
787,803  12/1957  Great Britain .................. 324/16 T Primary Examiner—Michael J. Lynch
Attorney, Agent, or Firm—Richard G. Stahr

[57] ABSTRACT

An operational amplifier circuit is responsive to an ignition signal, produced each time an ignition spark potential is generated for the reference cylinder of the engine, and to the zero crossover point, which occurs at the time the piston of the reference cylinder of the engine is at the top dead center position, of a square wave signal pulse produced by another operational amplifier in response to the single cycle alternating current compression signal output of a rate of change pressure transducer sensitive to the pressure within the reference cylinder for producing a series of timing angle signal pulses, each of a width equal to the period between the ignition signals and the zero crossover point of the square wave signal pulses. These timing angle signal pulses are averaged by a filter circuit network which produces a direct current potential output signal of a magnitude equal to the average of the timing angle signal pulses. This signal is compared with a direct current timing angle reference potential signal by a third operational amplifier which produces an output signal of a magnitude proportional to the number of degrees of the ignition spark advance or retard and a zero output signal when the ignition spark occurs at the selected number of degrees of ignition spark advance.

1 Claim, 1 Drawing Figure

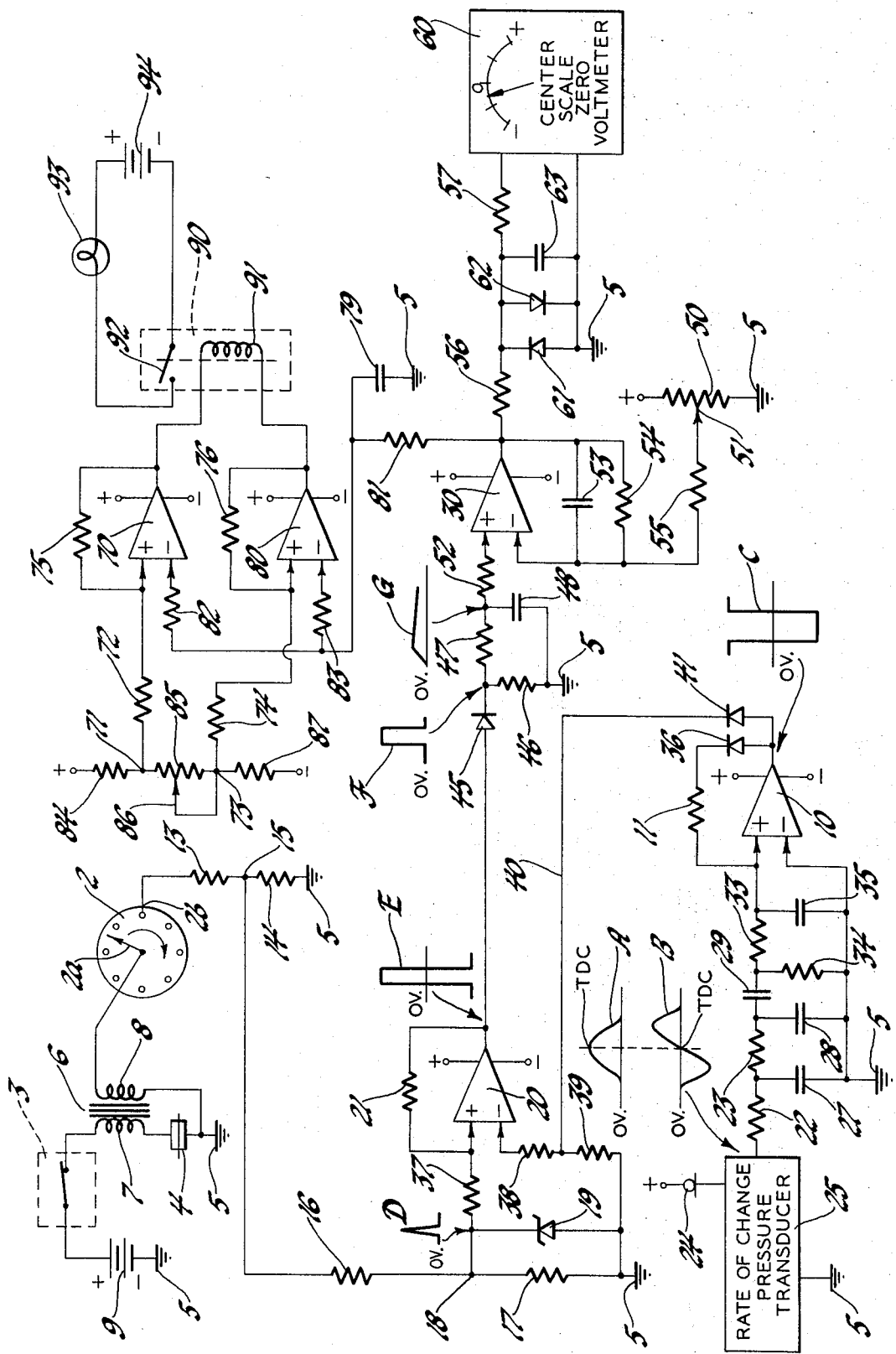

INTERNAL COMBUSTION ENGINE IGNITION TIMING INSTRUMENT

The subject invention is directed to an internal combustion engine ignition timing instrument.

To provide for the timing of the ignition spark of an internal combustion engine, a timing mark is located upon the engine flywheel or the harmonic balancer or any other rotating part which revolves at engine crankshaft speed which, when aligned with an adjacent mark upon a stationary member of the engine, indicates fired the piston of the reference cylinder is at the top dead center position. By use of a stroboscopic light which illuminates the timing mark and the adjacent mark when the spark plug of the reference cylinder is fied and noting the position of the timing mark relative to the stationary adjacent mark, the distributor may be revolved to provide the desired number of degrees of ignition spark retard or advance. This prior art method has proved to be inaccurate and deficient in angular resolution, principally in view of manufacturing tolerances, consequently, an internal combustion engine ignition timing instrument which precisely times the engine ignition spark at the selected number of degrees of ignition spark advance is desirable.

It is, therefore, an object of this invention to provide an improved internal combustion engine ignition timing instrument.

It is another object of this invention to provide an improved internal combustion engine ignition timing instrument which provides a visual indication with sufficient angular resolution when the ignition spark occurs at a selected number of degrees of ignition spark advance.

It is an additional object of this invention to provide an improved internal combustion engine ignition timing instrument which is not dependent upon mechanical timing marks.

In accordance with this invention, an internal combustion engine ignition timing instrument is provided which produces a direct current timing angle potential level output signal of a magnitude proportional to the number of degrees of ignition spark retard or advance in response to the average magnitude of a series of pulses, each of a width equal to the period between an ignition signal produced when an ignition spark potential is generated for the reference cylinder of the engine and the zero crossover point of another compression signal occurring at the time the piston of the reference cylinder is at the top dead center position, and a reference signal of a magnitude proportional to a selected number of degrees of ignition spark advance.

For a better understanding of the present invention, together with additional objects, advantages and features thereof, reference is made to the following description and accompanying single FIGURE drawing which sets forth the internal combustion engine ignition timing instrument of this invention in schematic form.

As the point of reference or ground potential is the same point electrically throughout the system, it has been represented in the drawing by the accepted schematic symbol and referenced by the numeral 5.

To supply the direct current operating potential to the circuit of this invention, conventional commercially available direct current power supplies may be employed. For this reason, and in the interest of reducing drawing complexity, the direct current power supplies have not been shown in the FIGURE. Each point in the circuit which is connected to a direct current power supply is labeled "plus" (+) or "minus" (−) to indicate the terminal of the direct current power supply to which it is connected.

As is well known in the automotive art, the primary winding of the ignition coil is connected across the battery through a set of ignition distributor breaker contacts which are operated open and closed in timed relationship with the engine by the distributor rotor. Referring to the FIGURE, with ignition switch 3 closed, primary winding 7 of ignition coil 6 is connected to the positive terminal of battery 9 through ignition switch 3 and to the negative polarity terminal of battery 9 through the ignition distributor breaker contacts 4 and point of reference or ground potential 5. With ignition switch 3 closed, the distributor breaker contacts 4, while in the closed condition, as shown in the FIGURE, establish an energizing circuit for the ignition coil primary winding 7 and, when operated by the distributor rotor cam to the open condition, interrupt the energizing circuit for the ignition coil primary winding 7. Upon the interruption of the ignition coil primary winding 7 energizing circuit, the resulting collapsing magnetic field induces an ignition spark potential in secondary winding 8 in a manner well known in the art.

Also as is well known in the automotive art, the ignition spark potential generated in the secondary winding of the ignition coil upon each operation of the ignition distributor breaker contacts to the open condition is directed to the spark plugs of the engine cylinders through the rotating contact and the respective stationary contacts of a conventional ignition distributor. In the FIGURE, the ignition distributor 2 is schematically represented and is illustrated as having a rotating contact member 2a and a plurality of stationary contacts, represented in the FIGURE as a series of circumferentially arranged small circles. Upon the operation of the distributor breaker contacts 4 to the open condition by the ignition distributor cam to interrupt the energizing circuit for primary winding 7 of ignition coil 6 when the rotating contact 2a of distributor 2 is in electrical conductive relationship with stationary contact 2b, to which the spark plug of the reference cylinder of the engine is connected, the ignition spark potential generated in secondary winding 8 is for the reference cylinder of the engine. This ignition spark potential produces a current flow through series resistors 13 and 14 to point of reference or ground potential 5. This flow of current produces a potential drop across series resistor 14 which is of a positive polarity upon junction 15 with respect to point of reference or ground potential 5. This potential produces a flow of current through current limiting resistor 16 and load resistor 17, consequently, an ignition signal potential appears across load resistor 17 of a positive polarity upon junction 18 with respect to point of reference or ground potential 5. This ignition signal potential is limited to a selected workable value, for example 10 volts, by Zener diode 19.

A commercially available rate of change pressure transducer 25 is mounted upon the engine in such a manner as to be responsive to the pressure within the reference cylinder of the engine for producing a single cycle alternating current compression signal during each compression and power stroke having the zero crossover point occurring when the piston of the reference cylinder of the engine is at the top dead center position. That is, rate of change pressure transducer 25 is responsive to the pressure within the reference cylinder during the time the piston in that cylinder goes through its upward compression stroke and downward through its power stroke in a manner well known in the automotive art. A rate of change pressure transducer suitable for use with the ignition timing instrument circuit of this invention is a Model 101M12 I.C.P. marketed by PCB Piezotronics, Inc. of Buffalo, New York. As rate of change pressure transducer 25 is well known in the art, it has been illustrated in the FIGURE in block form. Operating potential is supplied to rate of change pressure transducer 25 through a constant current diode 24 connected between the positive polarity terminal of a source of operating direct current potential and rate of change pressure transducer 25. One example of a constant current diode suitable for use with this application is a type MCL1302 marketed by Motorola Semiconductor Products, Inc.

As is illustrated in the FIGURE by curves A and B, rate of change pressure transducer 25 is responsive to the change of pressure within the reference cylinder, curve A, as the piston of that cylinder travels through the compression and power strokes to produce a single cycle alternating current output compression signal, curve B, having a negative polarity first half cycle, a zero crossover point occurring when the piston of the reference cylinder is at the top dead center position and a positive polarity second half cycle.

The single cycle alternating current compression signal produced by rate of change pressure transducer 25 during each compression and power stroke of the piston of the reference cylinder is filtered by series resistors 22 and 23 and parallel capacitors 27 and 28, and any D.C. component present upon the alternating current compression signal is removed by coupling capacitor 29. The compression signal is further filtered by parallel resistor 33, series resistor 34 and parallel capacitor 35.

The filtered alternating current compression signal is applied to the non-inverting input terminal of a conventional operational amplifier 10, the inverting input terminal of which is connected to point of reference or ground potential 5. As the single cycle alternating current compression signal begins to go negative, the signal upon the output terminal of operational amplifier 10 abruptly reverses to a negative polarity signal, curve C of the FIGURE. Since diode 36 blocks this negative polarity signal from being fed back to the non-inverting input terminal of operational amplifier 10 through feedback resistor 11, the output terminal of operational amplifier 10 remains overdriven at a substantially constant negative magnitude until the compression signal crosses zero and begins the positive half cycle. At this time, the signal upon the output terminal of operational amplifier 10 abruptly changes to a positive polarity signal. Feedback resistor 11 and resistors 33 and 34 are so proportioned that a small positive polarity voltage is maintained upon the non-inverting input terminal of operational amplifier 10, for example 0.2 volts, through diode 36 to maintain the output signal of operational amplifier 10 at a positive polarity potential, as indicated by curve C, thereby eliminating spurious switching of operational amplifier 10 due to noise fluctuations around zero between normal compression cycles. That is, operational amplifier 10 is responsive only to the negative polarity excursion of each alternating current compression signal for producing a square wave signal pulse having a negative going leading edge from a positive polarity potential to a negative polarity potential and a positive going trailing edge from a negative polarity potential to a positive polarity potential which crosses zero at the time the piston of the reference cylinder of the engine is at the top dead center position.

The ignition signal, curve D of the FIGURE, appearing across resistor 17 and limited by Zener diode 19 is applied through resistor 37 to the non-inverting input terminal of conventional operational amplifier 20, the inverting input terminal of which is connected to point of reference or ground potential 5 through series resistors 38 and 39 and to the output terminal of operational amplifier 10 through lead 40 and diode 41. Upon the occurrence of an ignition signal, which is of a positive polarity upon junction 18 with respect to point of reference or ground potential 5, while the negative polarity square wave signal pulse is present upon the output terminal of operational amplifier 10, the signal upon the output terminal of operational amplifier 20 abruptly changes from a negative to a positive polarity signal as indicated by curve E of the FIGURE. As this positive polarity signal is fed back to the non-inverting input terminal of operational amplifier 20 through feedback resistor 21, this positive polarity signal is maintained upon the output terminal of operational amplifier 20 while the negative polarity square wave signal is present upon the output terminal of operational amplifier 10. When the signal upon the output terminal of operational amplifier 10 abruptly changes from a negative potential to a positive potential at the beginning of each positive polarity excursion of the alternating current compression signal which crosses zero when the piston of the reference cylinder of the engine is at the top dead center position, this signal is applied to the inverting input terminal of operational amplifier 20 through diode 41, lead 40 and resistor 38, a condition which produces an abrupt change of the signal upon the output terminal of operational amplifier 20 from a positive polarity potential to a negative polarity potential as indicated by curve E. As the positive polarity potential is maintained upon the output terminal of operational amplifier 10 for reasons previously explained, this positive polarity signal maintains the negative polarity signal upon the output terminal of operational amplifier 20 until the negative polarity excursion of the next alternating current compression signal enables operational amplifier 20 to again be switched positive by the next ignition signal.

The output signal of operational amplifier 20 is half wave rectified by diode 45, consequently, a positive polarity pulse, curve F of the FIGURE, of a width equal to the period between each ignition signal and the time the square wave signal pulse produced by operational amplifier 10 crosses zero appears across resistor 46. Consequently, operational amplifier 20 and diode 45 are responsive to each ignition signal and each square wave signal pulse produced by operational amplifier 10 for producing a series of timing angle signal pulses each of a width equal to the period between each ignition signal and the time each of the square wave signal pulses crosses zero.

The timing angle signal pulses are filtered by a three-stage R-C filter circuit network in which the first stage comprising resistor 47 and capacitor 48 produces a direct current potential signal of a magnitude equal to the average of the timing angle signal pulses, as shown by curve G of the FIGURE.

To produce a direct current timing angle reference potential signal, a potentiometer 50 having a movable contact 51 is connected across the positive polarity terminal of a direct current potential source and point of reference or ground potential 5, as shown in the FIGURE. The direct current potential signal produced by resistor 47 and capacitor 48 is applied through resistor 52 to the non-inverting input terminal of conventional operational amplifier 30. The output signal of operational amplifier 30 is fed back to the inverting input terminal thereof through capacitor 53 and resistor 54 to provide the desired gain and a second stage of filtering. In addition, the direct current timing angle reference potential signal appearing across the movable contact 51 of potentiometer 50 and point of reference and ground potential 5 is applied to the inverting input terminal of operational amplifier 30 through resistor 55. Potentiometer 50 is so adjusted that when the ignition spark occurs at a selected number of degrees of ignition spark advance, the magnitude of the potential applied to the inverting input terminal of operational amplifier 30 is equal to the magnitude of the direct current potential signal produced by the R-C filter circuit network applied to the non-inverting input terminal of operational amplifier 30 to produce a zero output signal.

With these adjustments, should the ignition spark occur at a time more advanced than the selected number of degrees of ignition spark advance, the potential applied to the non-inverting input terminal of operational amplifier 30 would be of a magnitude greater than that applied to the inverting input terminal thereof, consequently, the output signal of operational amplifier 30 would be of a positive polarity and of a magnitude proportional to the number of degrees of ignition spark advance greater than that selected and should the ignition spark occur at a time more retarded than the selected number of degrees of ignition spark advance, the potential applied to the non-inverting input terminal of operational amplifier 30 would be of a magnitude less than that applied to the inverting input terminal thereof, consequently, the output signal of operational amplifier 30 would be of a negative polarity and of a magnitude proportional to the number of degrees of ignition spark advance less than that selected. That is, operational amplifier 30 is responsive to the direct current potential signal appearing across capacitor 48 and the direct current timing angle reference signal for producing a direct current timing angle potential signal of a magnitude proportional to the number of degrees of ignition spark advance and retard and of a polarity which indicates whether the ignition spark is advanced or retarded.

The output signal of operational amplifier 30 is applied through series resistors 56 and 57 to one of the input terminals of a conventional center scale zero direct current voltmeter 60. Should the voltmeter indicate a negative polarity direct current timing angle potential signal, the operator revolves the ignition distributor in a direction to advance the ignition spark until the voltmeter 60 reads zero, at which time the ignition spark occurs at the selected number of degrees of ignition spark advance. Should voltmeter 60 indicate a positive direct current timing angle potential signal, the operator revolves the ignition distributor in a direction to retard the ignition spark until voltmeter 60 reads zero, at which time the ignition spark would occur at the selected number of degrees of ignition spark advance.

Should it be desirable to adjust the ignition spark of various engines at various different degrees of ignition spark advance, a corresponding number of potentiometers for producing the required direct current timing angle reference potential for each selected number of degrees of ignition spark advance is provided.

Diodes 61 and 62 provide protection for voltmeter 60 should the potential upon the output terminal of operational amplifier 30 exceed the breakdown potential of either of these diodes and capacitor 63 provides the third stage of filtering of the timing angle signal pulses.

Should the ignition spark occur after the square wave signal pulse produced by operational amplifier 10 crosses zero from a negative to a positive polarity potential, the output of operational amplifier 20 would be of a negative polarity, consequently, a substantially ground potential would appear upon the non-inverting input terminal of operational amplifier 30. With this condition, the positive polarity reference potential signal applied to the inverting input terminal thereof would produce a negative polarity output signal upon the output terminal of operational amplifier 30. Consequently, voltmeter 60 would indicate a negative polarity potential, consequently, the operator would revolve the distributor in the direction to advance the ignition spark.

Should it be desirable to provide an additional signal to indicate when the ignition spark occurs at the selected number of degrees of ignition spark advance, the output signal of operational amplifier 30 may be applied to the inverting input terminal of each of operational amplifiers 70 and 80 through a filter circuit comprising capacitor 79 and resistor 81 and input resistors 82 and 83. A voltage divider consisting of resistor 84, potentiometer 85 having a movable contact 86 and resistor 87 are connected in series across the positive and negative polarity terminals of a source of direct current potential. Junction 71 between resistor 84 and potentiometer 85 is connected to the non-inverting input terminal of operational amplifier 70 through input resistor 72 and junction 73 between potentiometer 85 and resistor 87 is connected to the non-inverting input terminal of operational amplifier 80 through input resistor 74. Feedback resistors 75 and 76 of respective operational amplifiers 70 and 80 are selected to provide a definite switching action with a small hysteresis for each of these two devices. Should the ignition spark be advanced, a positive polarity potential appears upon the output terminal of operational amplifier 30 and is applied to the inverting input terminal of each of operational amplifiers 70 and 80. Should this potential be more positive than that upon the non-inverting input terminal of each of operational amplifiers 70 and 80, as determined by the setting of movable contact 86 of potentiometer 85, a negative polarity signal appears upon the output terminal of both, consequently, operating coil 91 of a relay 90 is not energized. Should the ignition spark be retarded, a negative polarity potential appears upon the output terminal of operational amplifier 30 and is applied to the inverting input terminal of each of operational amplifiers 70 and 80. Should this potential be more negative than that upon the non-inverting input terminal of each of operational amplifiers 70 and 80, as determined by the setting of movable contact 86 of potentiometer 85, a positive polarity signal appears upon the output terminal of both, consequently, operating coil 91 of relay 90 is not energized. Should the ignition spark occur at the selected number of degrees of ignition spark advance within the limits as determined by the setting of movable contact 86 of potentiometer 85, a substantially ground or zero potential appears upon the output terminal of operational amplifier 30 and is applied to the inverting input terminal of each of operational amplifiers 70 and 80. With a substantially ground or zero potential applied to the inverting input terminal of each of operational amplifiers 70 and 80, a positive polarity potential is present upon the output terminal of operational amplifier 70 and a negative polarity potential is present upon the output terminal of operational amplifier 80, consequently, relay coil 91 is energized to close movable contact 92. The closing of relay contact 92 establishes an energizing circuit for indicator lamp 93 which may be traced from the positive polarity terminal of battery 94 through lamp 93, closed relay contact 92 to the negative polarity terminal of battery 94.

Throughout this specification, specific electrical components and polarities have been specified. It is to be specifically understood that alternate circuit components and compatible electrical polarities may be employed without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An internal combustion engine ignition timing instrument comprising: means for producing an ignition signal each time an ignition spark potential is generated for the reference cylinder of said engine; a rate of change pressure transducer responsive to the pressure within the reference cylinder of said engine for producing a single cycle alternating current compression signal during each compression and power stroke having the zero crossover point occurring when the piston of the reference cylinder of said engine is at the top dead center position; a first operational amplifier having inverting and non-inverting input terminals and an output terminal; means for connecting said inverting input terminal of said first operational amplifier to a point of reference potential; means for applying said alternating current compression signal to said non-inverting input terminal of said first operational amplifier; a second operational amplifier having inverting and non-inverting input terminals and an output terminal; means for connecting said inverting input terminal of said second operational amplifier to a point of reference potential and to said output terminal of said first operational amplifier; means for applying said ignition signal to the said non-inverting input terminal of said second operational amplifier; a third operational amplifier having inverting and non-inverting input terminals and an output terminal; first and second resistors; a capacitor; means for connecting said output terminal of said second operational amplifier to said non-inverting input terminal of said third operational amplifier through said first and second resistors in series; means for connecting said capacitor between the junction between said first and second resistors and a point of reference potential; means for producing a direct current timing angle reference potential signal; means for applying said direct current timing angle reference potential signal to said inverting input terminal of said third operational amplifier; and a center scale zero direct current voltmeter responsive to the output signal upon said output terminal of said third operational amplifier for providing an indication of ignition spark advance or retard and a zero reading at the selected number of degrees of ignition spark advance.

* * * * *